United States Patent
Kim et al.

(10) Patent No.: US 8,737,508 B2
(45) Date of Patent: May 27, 2014

(54) COMMUNICATION SYSTEM AND METHOD FOR COMMUNICATING THEREOF

(75) Inventors: Yu Seok Kim, Seoul (KR); Eun Yong Kim, Hwaseong-si (KR); Yung Soo Kim, Seongnam-si (KR); Sang Min Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 464 days.

(21) Appl. No.: 13/127,767

(22) PCT Filed: Oct. 21, 2009

(86) PCT No.: PCT/KR2009/006071
§ 371 (c)(1),
(2), (4) Date: May 5, 2011

(87) PCT Pub. No.: WO2010/053265
PCT Pub. Date: May 14, 2010

(65) Prior Publication Data
US 2011/0216817 A1    Sep. 8, 2011

(30) Foreign Application Priority Data
Nov. 7, 2008   (KR) .................. 10-2008-0110567

(51) Int. Cl.
*H04B 7/02*   (2006.01)

(52) U.S. Cl.
USPC ........... 375/267; 375/226; 375/227; 375/228; 375/260; 375/346; 375/347; 375/348; 375/349; 455/501; 455/513; 455/512; 455/517; 455/524; 455/63.1; 455/67.13; 455/101; 455/507; 370/312; 370/328; 370/471; 370/500; 370/491

(58) Field of Classification Search
USPC ......... 375/226, 227, 228, 260, 267, 346, 347, 375/348, 349; 455/501, 513, 512, 517, 524, 455/63.1, 67.13, 101, 507; 370/312, 328, 370/471, 500, 491
See application file for complete search history.

(56) References Cited

U.S. PATENT DOCUMENTS 8,179,775 B2 *   5/2012   Chen et al. .................... 370/203
2009/0252091 A1 *   10/2009   Tang et al. .................... 370/328

OTHER PUBLICATIONS

G. Bauch, et al., "MIMO Technologies for the Wireless Future" In: IEEE 19th International Symposium on Personal, Indoor and Mobile Radio Communications, Sep. 2008.

S. Shamai, et al., "Information-Theoretic Implications of Constrained Cooperation in Simple Cellular Models" In: IEEE 19th International Symposium on Personal, Indoor and Mobile Radio Communications, Sep. 2008.

P. Marsch, et al., "On multicell cooperative transmission in backhaul-constrained cellular systms" In: Annals of Telecommunications, vol. 63, No. 5-6, pp. 253-269, Jun. 2008.

(Continued)

*Primary Examiner* — Daniel Washburn
*Assistant Examiner* — Rahel Guarino
(74) *Attorney, Agent, or Firm* — The Farrell Law Firm, P.C.

(57) ABSTRACT

In the communications system of the present invention, a communications terminal determines a precoding matrix index in a pilot signal received through a specific downlink channel, examines channel quality information of the downlink channel according to the determined precoding matrix index, and transmits feedback information to a serving base station, which determines a priority factor by using the examined channel quality information, and compares the priority factor with other priority factors. The comparison is used such that a base station having a high priority suggests the use of the precoding matrix to the neighboring base station.

14 Claims, 5 Drawing Sheets

(56) References Cited

OTHER PUBLICATIONS

P. Marsch, et al., "On Backhaul-Constrained Multi-Cell Cooperative Detection based on Superposition Coding" In: IEEE 19th International Symposium on Personal, Indoor and Mobile Radio Communications, Sep. 2008.
PCT/ISA/237 Written Opinion issued on PCT/KR2009/006071 (3 pp.).
PCT/ISA/210 Search Report issued on PCT/KR2009/006071 (2 pp.).

* cited by examiner

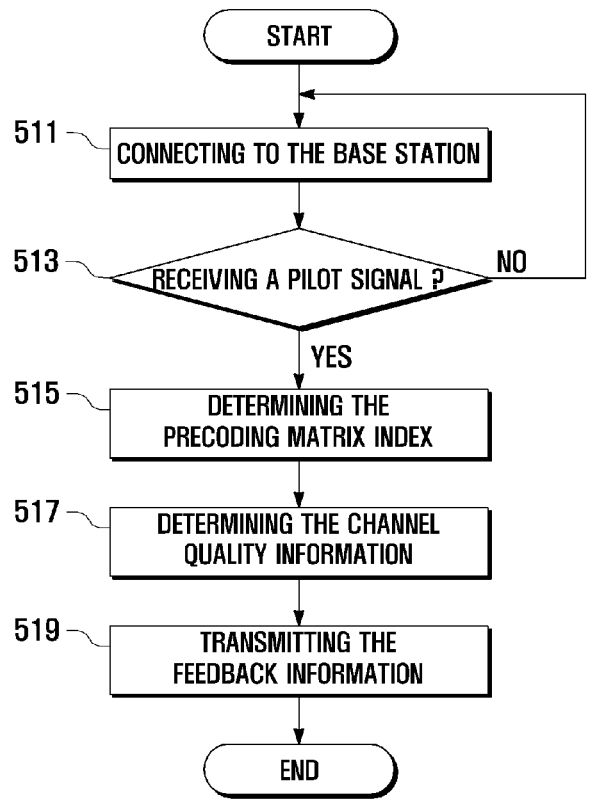
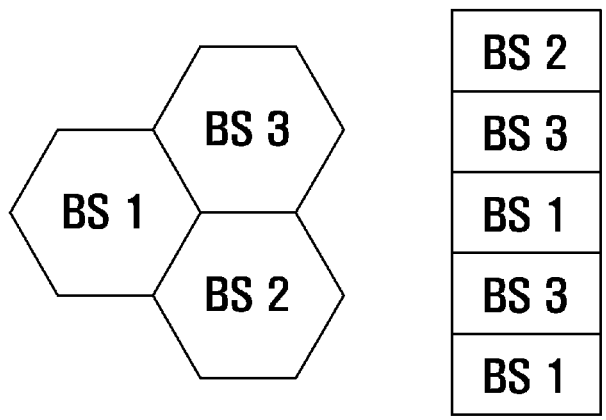

COMMUNICATION SYSTEM AND METHOD FOR COMMUNICATING THEREOF

TECHNICAL FIELD

The present invention relates to a communications system and a telecommunication method thereof, in particular, to a communications system of a multiple-input multiple-output (MIMO) type and a telecommunication method thereof.

BACKGROUND ART

Generally, a communications system provides various multimedia services including a voice service. Recently, the communications system is implemented with a multiple-input multiple-output type so that this multimedia service may be provided with a high quality at high speed. That is, in the communications system, the channel capacity is increased by using a plurality of antennas within restricted frequency resources. Hence, the multimedia service can be provided at high speed.

This communications system is made of a plurality of cells which mutually neighbors. At this time, the communications system includes a plurality of base stations for controlling each cell and a plurality of communications terminals connecting to one among base stations. And, in a unit cell, the base station and the communications terminal can perform the communications for the multimedia service. However, in the above described communications system, there is a problem that an interference between cells is generated in a boundary of the cells. This is because that the communications terminal can receive a signal of a plurality base stations in the boundary of cells. At this time, in the communications terminal, a signal for other communications terminal can be operated as interference. Thus, existing techniques repressing the interference between cells exist. By using a decentralized method, a signal of other base station can be prevented from operating as interference with respect to a communications terminal connected to a specific base station. That is, a corresponding base station can restrict or recommend that a precoding matrix index which can generate interference in the communications terminal is used in other base stations. Accordingly, the generation of interference between cells of the communications terminal can be prevented.

DISCLOSURE OF INVENTION

Technical Problem

However, as a plurality of base stations distributionally performs a mutual restriction on precoding matrix indexes according to its own standards by using a distributional method, a conflict phenomenon that the determination and the proposal of the precoding matrix index are continuously repeated can be appeared in each base station. Thus, the present invention suggests a base station cooperation technique which does not change a conventional system and prevents the collision of the precoding matrix index between cells by using a distributional method to select an efficient precoding matrix index such that the present invention performs an effective interference reduction between cells.

Solution to Problem

In order to achieve the above-mentioned object, according to an aspect of the invention, provided is a telecommunication method including: deciding a precoding matrix index by a communications terminal, in the reception of a pilot signal through a specific downlink channel, examining a channel quality information of the downlink channel according to the decided precoding matrix index; transmitting a feedback information including the decided precoding matrix index and the examined channel quality information to a serving base station by the communications terminal; deciding a priority factor by using the examined channel quality information by the serving base station, in the reception of the feedback information; and communicating with the communications terminal by the serving base station through the decided precoding matrix index.

The telecommunication method according to an aspect of the invention further includes comparing the decided priority factor with other priority factor by the serving base station, when receiving a backhaul information including the other priority factor from a neighboring base station which is adjacent to the serving base station. The backhaul information further includes other precoding matrix index and, in case the decided priority factor is lower than the other priority factor, the serving base station accepts a suggestion which restricts or invites a use of precoding matrix sent from the other base station. The communicating with the communications terminal is performed, in case the decided priority factor is higher than the other priority factor. The communicating with the communications terminal is performed, in case the pilot signal is a signal which is transmitted from the serving base station. The telecommunication method according to an aspect of the invention further includes transmitting a backhaul information including the decided precoding matrix index and the decided priority factor to a neighboring base station by the serving base station, in case the pilot signal is a signal which is transmitted from the neighboring base station which is adjacent to the serving base station. The priority factor is decided by assembling the channel quality information with at least one from among a service class to be performed in the serving base station, a number of times of repeat of the serving base station, and an intra cell traffic load added to the serving base station.

A telecommunication method according to another aspect of the invention includes: deciding a precoding matrix index by a communications terminal, when a serving base station receives a pilot signal through a specific downlink channel, examining a channel quality information of the downlink channel according to the decided precoding matrix index; transmitting a feedback information including the decided precoding matrix index and the examined channel quality information to a serving base station by the communications terminal; deciding a priority factor by using the examined channel quality information by the serving base station, in the reception of the feedback information; comparing the decided priority factor with other priority factor by the serving base station, when receiving a backhaul information including the other priority factor from a neighboring base station which is adjacent to the serving base station; and communicating with the communications terminal by the serving base station through the decided precoding matrix index, in case the decided priority factor is higher than the other priority factor.

The backhaul information includes other precoding matrix index, and further includes: restricting a use of the other precoding matrix index by the serving base station, in case the decided priority factor is lower than the other priority factor; and communicating with the communications terminal by the serving base station through the decided precoding matrix index. The priority factor is decided by assembling the channel quality information with at least one from among a service class to be performed in the serving base station, a number of times of repeat of the serving base station, and an intra cell traffic load added to the serving base station.

A telecommunication system according to an aspect of the invention includes: a communications terminal which is configured to decide a precoding matrix index, in the reception of a pilot signal through a specific downlink channel, to examine a channel quality information of the downlink channel according to the decided precoding matrix index, and to transmit a feedback information including the decided precoding matrix index and the examined channel quality information; and a serving base station which is configured to connect to the communications terminal, to decide a priority factor by using the examined channel quality information, in the reception of the feedback information, and to communicate with the communications terminal by using the decided precoding matrix index.

The telecommunication further includes: a neighboring base station which is adjacent to the serving base station, wherein the serving base station compares the decided priority factor with other priority factor, when receiving a backhaul information including the other priority factor from the neighboring base station. The backhaul information further includes: other precoding matrix index and, in case the decided priority factor is lower than the other priority factor, the serving base station accepts a suggestion which restricts or invites a use of precoding matrix sent from the other base station. The serving base station communicates with the communications terminal by using the decided precoding matrix index, in case the decided priority factor is higher than the other priority factor. The serving base station communicates with the communications terminal by using the decided precoding matrix index, in case the pilot signal is a signal which is transmitted from the serving base station. The serving base station transmits a backhaul information including the decided precoding matrix index and the decided priority factor to a neighboring base station, in case the pilot signal is a signal which is transmitted from the neighboring base station which is adjacent to the serving base station. The serving base station decides the priority factor by assembling the channel quality information with at least one from among a service class to be performed in the serving base station, a number of times of repeat of the serving base station, and an intra cell traffic load added to the serving base station.

Advantageous Effects of Invention

Therefore, a communications terminal and a telecommunication method thereof according to the present invention does not unconditionally limit a precoding matrix index in the base station, but determines a priority according to a priority factor without a collision of the precoding matrix through just only a small information exchange in a distributed environment to selectively restrict. Accordingly, the present invention can more efficiently prevent that interference between cells is generated in a communications terminal.

BRIEF DESCRIPTION OF DRAWINGS

FIG. 5 is a flowchart illustrating a communications procedure of a communications terminal in FIG. 2; and
FIG. 6 is a drawing illustrating a priority distribution by frequency in one group consisted of three base stations according to another exemplary embodiment of the present invention.

Mode for the Invention

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In below description, a base station of communications system and a communications terminal share a predefined codebook. At this time, the code book is consisted of a plurality of precoding matrix. Here, a precoding matrix index PMI is an index indicating a precoding matrix precoding vector which is used to precode a signal for transmitting to the communications terminal from the base station, and corresponds to the precoding matrix on a one-to-one basis.

Figure 1:
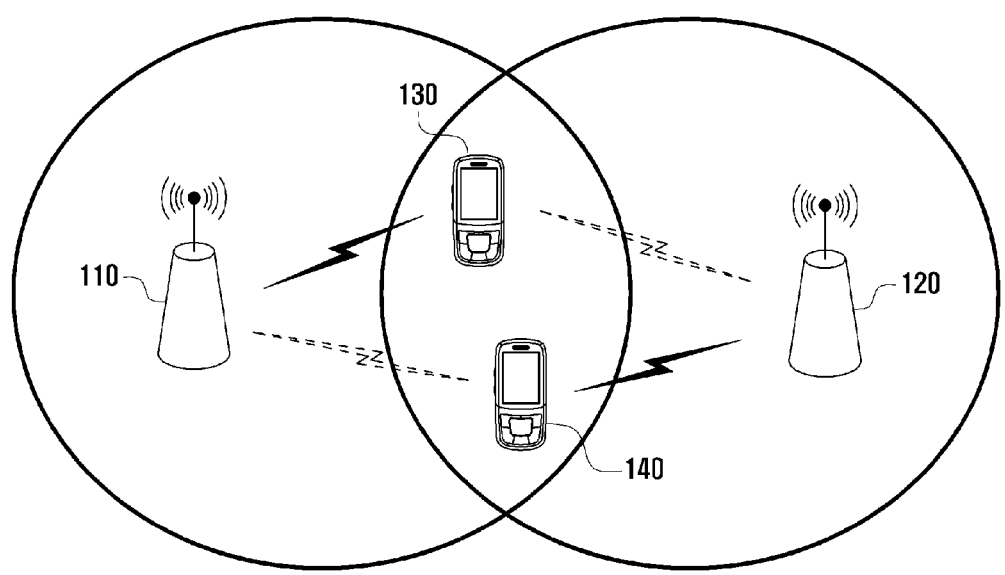
FIG. 1 is a drawing illustrating a schematic configuration of a communications system according to an exemplary embodiment of the present invention.

FIG. 1 is a drawing illustrating a schematic configuration of a communications system according to an exemplary embodiment of the present invention. At this time, in the present exemplary embodiment, the communications system can be implemented with a multiple-input multiple-output type, but it is not limited to this.

Referring to FIG. 1, a communications system of the exemplary embodiment is consisted of a plurality of cells. At this time, respective cells can be mutually adjacent. This communications system includes a plurality of base stations 110, 120 for controlling each cell, for example, a first base station 110, a second base station 120, a first communications terminal 130 and a second communications terminal 140. The first base station 110 and the second base station 120 transmit a signal for the multimedia service in respective relative cells. The first communications terminal 130 and the second communications terminal 140 have portability respectively, and can be connected to the first base station 110 or the second base station 120.

That is, in a unit cell, the first base station 110 or the second base station 120 connects to the first communications terminal 130 or the second communications terminal 140, and can perform the communications for a multimedia service. At this time, in the communications system, the first communications terminal 130 or the second communications terminal 140 can be positioned at a boundary between cells of the first base station 110 and the second base station 120.

The first communications terminal 130 or the second communications terminal 140 can receive a signal of the first base station 110 and the second base station 120. For example, the second communications terminal 140 can be positioned at the boundary between cells of the first base station 110 and the second base station 120 while being connected to the second base station 120. And the second communications terminal 140 can receive a pilot signal of the first base station 110 as well as a pilot signal of the second base station 120. At this time, a signal of the first base station 110 can be operated as interference in the second communications terminal 140.

Figure 2:
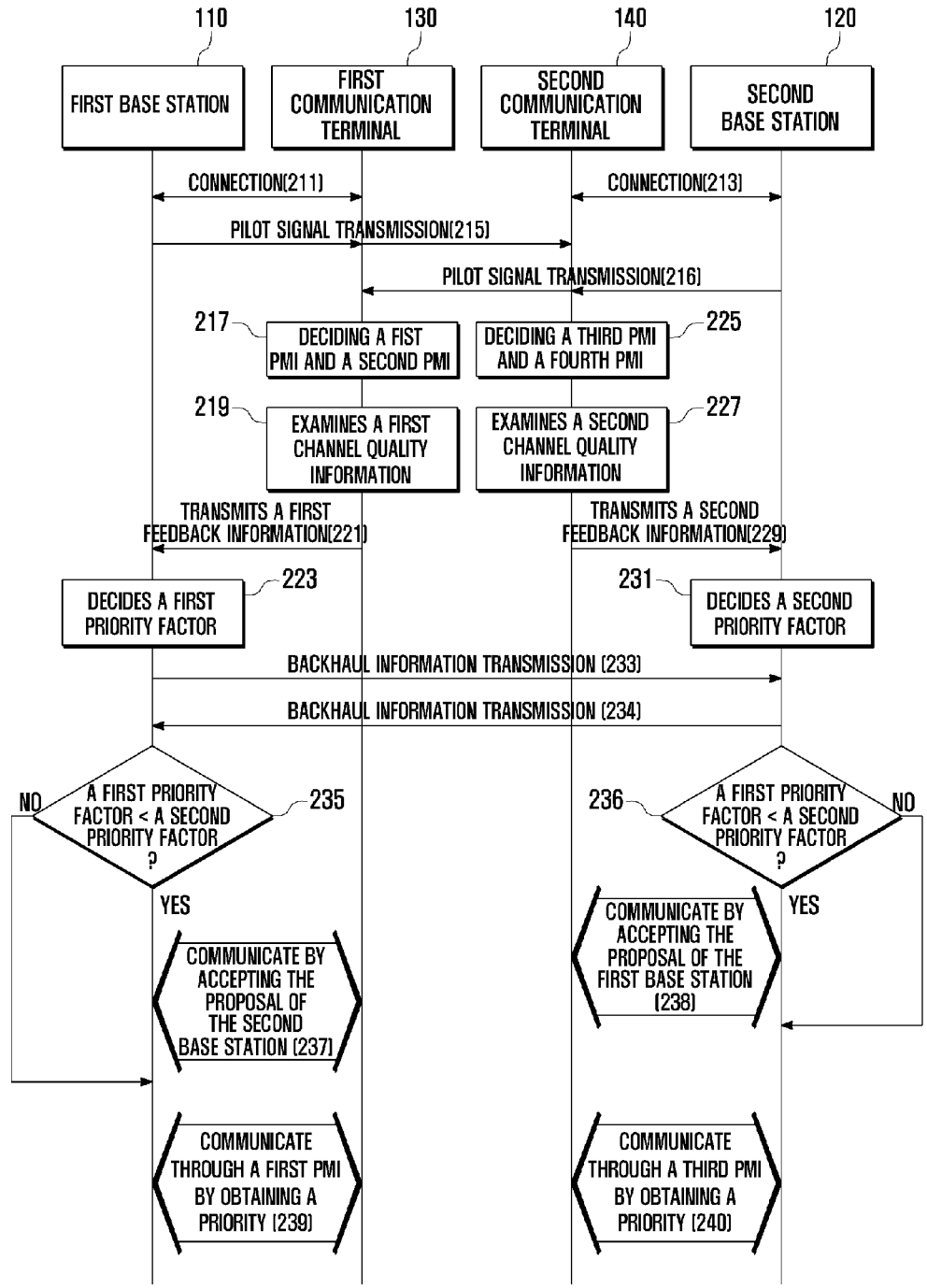
FIG. 2 is a flowchart illustrating a signal flow in a communications procedure execution.
Figure 3:
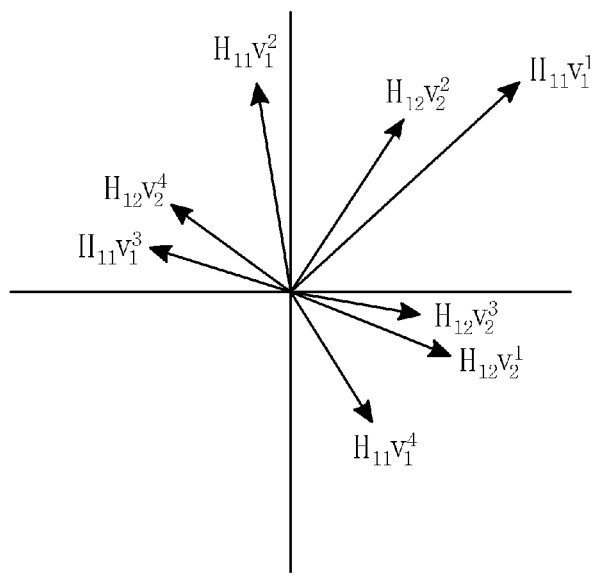
FIG. 3 is exemplary diagrams for illustrating FIG. 2.

FIG. 2 is a flowchart illustrating a signal flow in a communications procedure execution in an exemplary embodiment of the present invention. FIG. 3 is exemplary diagrams for illustrating FIG. 2.

At this time, in the present embodiment, it is assumed that the first communications terminal 140 connects to the first base station 110 and the second communications terminal 140 connects to the second base station 120. That is, the first base station 110 is a serving base station and the second base station 120 is a neighboring base station with respect to the first communications terminal 130.

In addition, the first base station 110 is a neighboring base station and the second base station 120 is a serving station with respect to the second communications terminal 140. Here, a procedure for restricting the precoding matrix index in the first base station 110 is expatiated and applied to the second base station 120. Additionally, FIG. 2 discloses the case of two base stations, but it is applicable to the case of over two base stations.

Referring to FIG. 2, in the precoding matrix assignment procedure of the embodiment, the first base station 110 and the first communications terminal 130 are interconnected (211) while the second base station 120 and the second communications terminal 140 are interconnected (213). Then, the first base station 110 broadcasts a pilot signal (215). Similarly, the second base station 120 broadcasts a pilot signal (216).

The first communications terminal 130 decides a first precoding matrix index in the reception of the pilot signal of the first base station 110 (217). At this time, the first communications terminal 130 decides the first precoding matrix index in response to the most friendly precoding matrix among precoding matrixes which are usable in the first base station 110.

That is, the first communications terminal 130 estimates a downlink channel ($H_{11}$) with the first base station 110 through the pilot signal, detecting an effective channel of a corresponding downlink channel ($H_{11}$).

Referring to example of FIG. 3, the first communications terminal 130 decides a first precoding matrix index corresponding to the precoding matrix $v^1_1$, in response to the precoding matrix of the effective channel ($H_{11}V^1_1$) which has a maximum channel gain among effective channels ($H_{11}V^1_1$).

Additionally, in the reception of the pilot signal of the second base station 120, the first communications terminal 130 decides the second precoding matrix index at step 217. At this time, the first communications terminal 130 decides the second precoding matrix index, in response to the precoding matrix which is most unfriendly to the first communications terminal 130 among precoding matrixes which are usable in the second base station 120. That is, the first communications terminal 130 estimates the downlink channel ($H_{12}$) with the second base station 120 through the pilot signal, detecting the effective channels of a relevant downlink channel ($H_{12}$).

Referring to example of FIG. 3, the first communications terminal 130 decides a second precoding matrix index corresponding to the precoding matrix $v^2_2$, in response to the precoding matrix of the effective channel ($H_{12}V^2_2$) which has the largest channel gain (i.e. the largest interference signal intensity) among effective channels ($H_{12}V^1_2$). The method for deciding the second precoding index is various and above method is just one of those examples.

The first communications terminal 130 examines a first channel quality information (219). At this time, the first channel quality information can be at least one from among the Signal-to-Interference Ratio (SINR), the Signal-to-Noise Ratio (SNR), and the Received Signal Strength Indication (RSSI).

For example, the first channel quality information can be the SINR to which the first precoding matrix ($v^1_1$) and a precoding matrix affecting the largest interference as the interference excepting the second precoding matrix ($v^2_2$) are reflected. Then, the first communications terminal 130 transmits a first feedback information to the first base station 110 (221).

At this time, the first communications terminal 130 generates the first feedback information which is made by quantizing the index of the first precoding matrix and the second precoding matrix and the first channel quality information, and feedbacks the first feedback information to the first base station 110. Here, the precoding matrix information to feed back with the channel quality information is various according to the various kinds and the extent to express, and the above description is one example of various channel quality information.

And then, in the reception of the first feedback information, the first base station 110 decides a first priority factor (223). At this time, the first base station 110 can determine the first priority factor according to the first channel quality information of the first feedback information. For example, the first base station 110 can previously store priority factors which are classified according to a given range. The first base station 110 can determine the first priority factor in responds to the first channel quality information.

Here, as the first channel quality information recognized in the first communications terminal 130 is high, the first base station 110 can determine the first priority factor to be high. The determined first priority factor is transmitted to the second base station 120 together with information for suggesting on the selection of the precoding matrix of the second base station 120 with a method such as the backhaul (233).

Here, an example of the precoding matrix index information suggesting the restriction is illustrated. In the meantime, the second communications terminal 140 decides a third precoding matrix index and a fourth precoding matrix index (225) like step 217 in the first communications terminal 130. And, similarly to the first communications terminal 130, the second communications terminal 140 obtains a second channel quality information (227) and feed backs it to the second base station 120 (229).

Then, the second communications terminal 140 decides a second priority factor (231) and transmits it to the first base station 110 with the precoding matrix index information to suggest with a method such as backhaul (234).

Finally, in the reception of backhaul information, the first base station 110 cross-compares the first priority factor and the second priority factor (235). That is, the first base station 110 determines whether the first priority factor is lower than the second priority factor.

At this time, at step 235, if it is determined that the first priority factor is higher than the second priority factor, the first base station 110 obtains a priority and communicates with the first communications terminal 130 using the first precoding matrix ($v^1_1$) while having the first precoding matrix index information.

On the other hand, the second base station 120 loses a priority and accepts the proposal of the first base station 110 (238), for example, it restricts the second precoding matrix in a code book, so that it selects the precoding matrix for communications with the second communications terminal 140 for itself in the rest precoding matrixes.

For example, a precoding matrix which has the largest effective channel gain is selected without the second precoding matrix. In the meantime, at step 235, if it is determined that the first priority factor is lower than the second priority factor, the role of the second base station 120 and the first base station 110 is changed contrary to the above example while the priority returning to the second base station 120.

In the meantime, in the present exemplary embodiment, it was exemplified that the first base station 110 determines the first priority factor according to the first channel quality information at step 223 and the second base station 120 determines the second priority factor according to the second channel quality information at step 231, but it is not limited to this.

That is, the first base station 110 can determine the first priority factor according to the service data of the multimedia service provided from the first base station 110 as well as the first channel quality information at step 223.

Furthermore, the second base station 120 can determine the second priority factor according to the service data of the multimedia service provided from the second base station 120 as well as the second channel quality information at step 231. For example, the first base station 110 can determine the first priority factor according to the first channel quality information and a service class of the multimedia service provided by the first base station 110.

As an example, the first base station 110 can determine the first priority factor to be high, as a corresponding multimedia service is sensitive to a time delay. Alternatively, the first base station 110 can determine the first priority factor to be low, as a corresponding multimedia service is sensitive to a time delay.

Furthermore, the second base station 120 can determine the second priority factor according to the second channel quality information and a service class of the multimedia service provided by the second base station.

As an example, the second base station 120 can determine the second priority factor to be high, as a corresponding multimedia service is sensitive to a time delay. Alternatively, the second base station 120 can determine the second priority factor to be low, as a corresponding multimedia service is sensitive to a time delay. Here, service classes can be classified like below <Table 1>.

TABLE 1

| Service class | Description. |
| --- | --- |
| Non-request guarantee service | A service which is a kind of the real time service, in which the same bandwidth should be allocated while a connection is maintained like VoIP |
| Real time service | A service that a bandwidth is changeably allocated while a connection is maintained |
| Non-realtime service | A service that a bandwidth is allocated with a non-guarantee type while a connection is maintained like FTP but the data transmission is not bursty |
| Best-effort service | A service that a bandwidth is allocated with a non-guarantee type while a connection is maintained and the data transmission is bursty |

Alternatively, the first base station 110 can determine the first priority factor according to the number of times of repeat related to the Hybrid Automatic Request (HARQ) classified according to the first channel quality information and a given standard. At this time, the first base station 110 can determine the first priority factor to be high, as the number of times of repeat is high. Alternatively, the first base station 110 can determine the first priority factor to be low, as the number of times of repeat is high. Furthermore, like the second channel quality information and the first base station 110, the second base station 120 can determine the second priority factor according to the number of times of repeat which is classified according to the given standard.

At this time, the second base station 120 can determine the second priority factor to be high as the number of times of repeat is high. Alternatively, the second base station 120 can determine the second priority factor to be low, as the number of times of repeat is high. Alternatively, the first base station 110 can determine the first priority factor according to a traffic load of inside of cell which is added to the first base station 110, different from the first channel quality information with a certain range. At this time, the first base station 110 can determine the first priority factor to be high, as the traffic load is high. Alternatively, the first base station 110 can determine the first priority factor to be low, as the traffic load is high.

Furthermore, similarly to the second channel quality information and the first base station 110, the second base station 120 can determine the second priority factor according to the intra cell traffic load which is added to the second base station 120. At this time, the second base station 120 high can determine the second priority factor to be high, as the traffic load is high.

Alternatively, the second base station 120 can determine the second priority factor to be low, as the traffic load is high. That is, altogether with the first channel quality information recognized through the first communications terminal 130, the first base station 110 can determine the first priority factor according to at least one from among the service class of the first base station 110, the number of times of repeat of the first base station 110, and the intra cell traffic load added to the first base station 110. Furthermore, altogether with the second channel quality information recognized through the second communications terminal 140, the second base station 120 can determine the second priority factor according to at least one from among the service class of the second base station 120, the number of times of repeat of the second base station 120, and the intra cell traffic load added to the second base station 120.

In the communications system according to an exemplary embodiment of the present invention, the operation procedure of each configuration of the communications system in the communications process execution is illustrated in detail.

Figure 4:
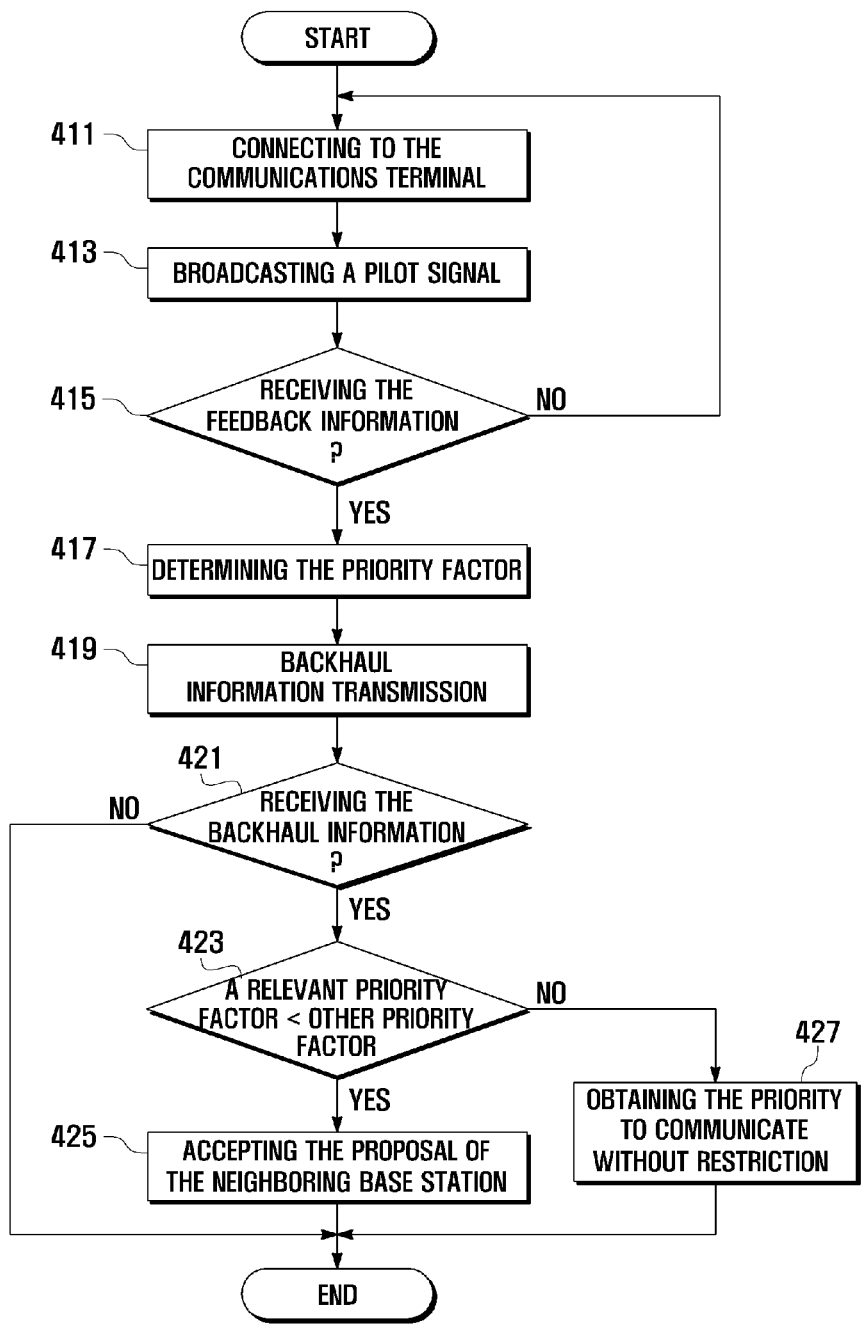
FIG. 4 is a flowchart illustrating a communications procedure of a base station in FIG. 2.

FIG. 4 is a flowchart illustrating a communications procedure of a base station in FIG. 2.

At this time, the base station 110, 120 can be a serving base station or a neighboring base station of a specific communications terminal 130, 140. Referring to FIG. 4, the communications procedure of the embodiment begins with the state where the base station 110, 120 connects to the communications terminal 130, 140 (411). The base station 110, 120 broadcasts a pilot signal (413). When the communications terminal 130, 140 receives the feedback information, the base station 110, 120 senses this (415), and determines the priority factor (417). At this time, the feedback information is consisted of the precoding matrix index selected in the communications terminal 130, 140 and the channel quality information recognized in the communications terminal 130, 140. Here, the base station 110, 120 determines the priority factor according to the channel quality information of the feedback information. When receiving the backhaul information including other priority factor, the base station 110, 120 senses this (421), and compares a relevant priority factor with other priority factor (423).

At this time, the backhaul information is consisted of other precoding matrix index and other priority factor. That is, the base station 110, 120 determines whether the relevant priority factor is lower than other priority factor. Finally, if it is determined that the relevant priority factor is lower than other priority factor at step 423, the base station 110, 120 accepts the proposal of the neighboring base station (425), for example, the base station 110, 120 restricts other precoding matrix index in the code book. That is, the base station 110, 120 restricts other precoding matrix index so as not to use for communication. And, if it is determined that the relevant priority factor is higher than other priority factor at step 423, the base station 110, 120 obtains the priority and communicate with a corresponding communications terminal by using the precoding matrix index without restriction (427).

FIG. 5 is a flowchart illustrating a communications procedure of a communications terminal in FIG. 2.

Referring to FIG. 5, the communications terminal 130, 140 of the embodiment connects to the base station 110, 120 (511). Then, when a pilot signal is received, the communications terminal 130, 140 sense this (513), and determine the precoding matrix index (515).

That is, the communications terminal 130, 140 estimates the downlink channel through the pilot signal and detects effective channels of a corresponding downlink channel. If the pilot signal is received in corresponding base stations 110, 120, the communications terminal 130, 140 determines the precoding matrix index, in response to the precoding matrix of the effective channel which has the highest channel gain among effective channels. If the pilot signal is transmitted from the neighboring base station 110, 120, as an example, the precoding matrix index is decided, in response to the precoding matrix of the effective channel which has the highest channel interference among effective channels. Then, the communications terminal 130, 140 examines the channel quality information (517).

At this time, the channel quality information can be at least one among the SINR, the SNR, and the RSSI. Moreover, the communications terminal 130, 140 transmits the feedback information to a corresponding base station 110, 120 (519).

At this time, the communications terminal 130, 140 generate the feedback information consisting of the precoding matrix index and the channel quality information, and feed backs it to a corresponding base station 110, 120. In the meantime, in the above-described embodiment, it was disclosed that the precoding matrix index and the priority factor of the base station are determined in the base station and this is backhauled to the neighboring base station such that the priority factors are compared to determine a priority. However, it is not limited to this. For example, when the collision of the precoding matrix index exchanging with the neighboring base station through the backhaul exists, thereafter, the priority factor is compared so that the priority can be determined.

In the meantime, in the above-described embodiment, it was disclosed that the precoding matrix is assigned to two cells in the communications system. However, it is not limited to this. That is, in the communications system, the present invention can be implemented with respect to three or more cells. In other words, in the allocation of the precoding matrix to three or more cells, the communications system will be operated similarly to the above-described embodiment.

In the meantime, in addition to the above-described method, the priority can be assigned in turn in a base station group for cooperating between base stations through the backhaul with a round robin method based on a frequency axis. It can be assigned according to a specific subband based on a frequency axis like OFDM or can be circulated based on a time axis. This method has an advantage of simplicity, but it can be unsatisfactory for reflecting the changing environment of the wireless telecommunications system.

FIG. 6 is a drawing illustrating a priority distribution by frequency in one group consisted of three base stations.

According to the present invention, in the communications system, it can be prevented that a signal of other base station operates as interference with respect to the communications terminal connected to a specific base station. That is, it is suggested that a precoding matrix index which generates interference to the communications terminal in the corresponding base station is used in other base station, so that the generation of the interference between cells can be suppressed. However, since a plurality of base stations reciprocaly suggest the precoding matrix index, the determination and restriction of the precoding matrix index can be constantly repeated in respective base stations.

However, in the base station, the precoding matrix index is not unconditionally suggested, but it is selectively suggested by obtaining the priority according to the priority factor without the collision of the precoding matrix through a small information exchange in the distributed environments, so that it can be prevented that the interference between cells is more efficiently generated in the communications terminal.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

The invention claimed is:

1. A telecommunication method comprising: deciding a precoding matrix index by a communications terminal, when a serving base station receives a pilot signal through a specific downlink channel, examining a channel quality information of the downlink channel according to the decided precoding matrix index; transmitting a feedback information including the decided precoding matrix index and the examined channel quality information to a serving base station by the communications terminal; deciding a priority factor by using the examined channel quality information by the serving base station, in the reception of the feedback information; comparing the decided priority factor with other priority factor by the serving base station, when receiving a backhaul information including the other priority factor from a neighboring base station which is adjacent to the serving base station; and communicating with the communications terminal by the serving base station through the decided precoding matrix index, in case the decided priority factor is higher than the other priority factor.

2. The telecommunication method of claim 1, wherein the backhaul information comprises other precoding matrix index, and further comprising: restricting a use of the other precoding matrix index by the serving base station, in case the decided priority factor is lower than the other priority factor; and communicating with the communications terminal by the serving base station through the decided precoding matrix index.

3. The telecommunication method of claim 1, wherein, in deciding a priority factor, the priority factor is decided by assembling the channel quality information with at least one from among a service class to be performed in the serving base station, a number of times of repeat of the serving base station, and an intra cell traffic load added to the serving base station.

4. A telecommunication method in a base station, the method comprising: receiving feedback information including a precoding matrix index and channel quality information, from a terminal; determining a first priority factor based on the feedback information; receiving a second priority factor from a neighbor base station; comparing the first priority factor with the second priority factor; and communicating with the terminal through a dedicated precoding matrix index selected based on a result of comparison.

5. The telecommunication method of claim 4, wherein the precoding matrix index included in the feedback information is selected as the dedicated precoding matrix index, when the first priority factor is higher than the second priority factor.

6. The telecommunication method of claim 4, wherein receiving the second priority factor comprises receiving backhaul information including an other precoding matrix index and the second priority factor, and wherein the communicating with the terminal comprises, when the first priority factor is lower than the second priority factor, accepting a suggestion which restricts or recommends a use of a precoding matrix corresponding to the second priority factor.

7. The telecommunication method of claim 4, wherein communicating with the terminal is performed, when the determined first priority factor is higher than the second priority factor.

8. The telecommunication method of claim 4, further comprising:
   transmitting backhaul information including the precoding matrix index and the first priority factor, to the neighbor base station, when the feedback information is generated based on a pilot signal transmitted from the neighbor base station.

9. The telecommunication method of claim 4, wherein the first priority factor is determined by assembling the channel quality information with at least one from among a service class to be performed in the base station, a number of repeat times of the base station, and an intra cell traffic load added to the base station.

10. An apparatus of a base station, the apparatus comprising:
   a transceiver configured to communicate data with an other network node; and
   a controller configured to receive feedback information including a precoding matrix index and channel quality information, from a terminal, determine a first priority factor based on the feedback information, receive a second priority factor from a neighbor base station, compare the first priority factor with the second priority factor, and communicate with the terminal through a dedicated precoding matrix index selected based on a result of comparison.

11. The apparatus of claim 10, wherein the precoding matrix index included in the feedback information is selected as the dedicated precoding matrix index, when the first priority factor is higher than the second priority factor.

12. The apparatus of claim 10, wherein the controller is further configured to receive backhaul information including an other precoding matrix index and the second priority factor, and to accept a suggestion which restricts or recommends a use of a precoding matrix corresponding to the second priority factor, when the first priority factor is lower than the second priority factor.

13. The apparatus of claim 10, wherein the controller is further configured to transmit backhaul information including the precoding matrix index and the first priority factor, to the neighbor base station, when the feedback information is generated based on a pilot signal transmitted from the neighbor base station.

14. The apparatus of claim 10, wherein the controller is further configured to determine the first priority factor by assembling the channel quality information with at least one from among a service class to be performed in the base station, a number of repeat times of the base station, and an intra cell traffic load added to the base station.

\* \* \* \* \*